(No Model.)
A. M. GRANGER.
Hose Nozzle.
No. 229,695. Patented July 6, 1880.
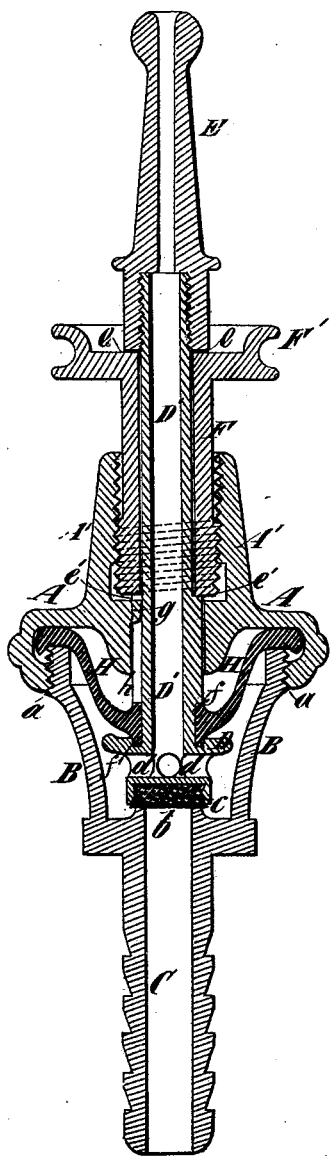
Witnesses
John Becker.
Fred T Haynes
Inventor
Almon M Granger
by his Attorneys
Brown & Brown

UNITED STATES PATENT OFFICE.

ALMON M. GRANGER, OF NEW ORLEANS, LOUISIANA, ASSIGNOR OF ONE-HALF OF HIS RIGHT TO GEORGE H. ROBINSON, OF NEW YORK, N. Y.

HOSE-NOZZLE.

SPECIFICATION forming part of Letters Patent No. 229,695, dated July 6, 1880.

Application filed March 30, 1880. (No model.)

*To all whom it may concern:*

Be it known that I, ALMON M. GRANGER, of New Orleans, in the parish of Orleans and State of Louisiana, have invented certain new and useful Improvements in Hose-Nozzles, of which the following is a specification.

Although my invention is applicable to hose-nozzles for various purposes in which a valve is employed for regulating the flow of liquid through the nozzle, it is especially adapted for use in connection with fire-extinguishers in which chemicals are used. The chemicals which are used with such extinguishers are very corrosive in their action; and the object of my invention is to furnish a nozzle in which the chemical or chemicals cannot come in contact with the parts of the nozzle which require to be adjusted or moved in operating it.

To this end my invention consists in the combination, with a nozzle comprising a valve for controlling the flow of liquid and a hollow stem and attached jet-pipe, through which the liquid is discharged, connected to said valve, of a diaphragm, of india-rubber or other suitable material, so arranged as to prevent the chemical liquid used from coming in contact with the movable parts of the nozzle, and thereby corroding them, so as to prevent their easy adjustment.

It also consists in the combination, in a nozzle comprising a valve for controlling the flow of liquid and a hollow longitudinally-grooved valve-stem and attached jet-pipe, through which the liquid is discharged, of a diaphragm arranged, as before stated, to prevent the chemical liquid used from coming in contact with the movable parts of the nozzle, and a feather fixed in the valve-shell and engaging with the groove in said stem, whereby the valve is prevented from turning relatively to the shell.

The accompanying drawing represents a central longitudinal section through a nozzle embodying my invention.

A B designate the outer shell of the nozzle, the part B constituting a removable cap, which is provided with an external screw-thread, $a$, engaging with an internal screw-threaded socket in the part A, so as to permit of its ready disengagement.

C designates a nipple, through which is the inlet-opening, projecting from the part B, and serving as a means for the attachment of a hose, it being grooved externally for the greater facility of securing the hose thereon.

Upon the interior of the part B is a raised valve-seat, $b$, and D represents a valve for closing the same, which is preferably provided with a soft-metal face, $c$.

The valve-stem D' is hollow, and the passage through it communicates by means of holes $d$ with the inside of the part A.

E designates a tip or jet-pipe screwed upon the end of the valve-stem D', and F designates a sleeve fitting outside the valve-stem, and having upon it a male screw-thread which engages with a female screw-threaded socket, A', extending from the part A.

The sleeve F has upon it a hand-wheel, F', by means of which it may be turned, and which in the present instance is represented as cast in one piece with the said sleeve.

Upon turning the hand-wheel F' so as to unscrew the sleeve F from the socket A' the upper end of the sleeve or the hand-wheel bears upon the shoulder $e$, formed by the tip, and raises the tip, valve-stem D', and valve D, so as to permit the liquid to flow through the nipple C, shell A, holes $d$, and valve-stem D'. Upon turning the hand-wheel F' in the other direction the sleeve bears upon the shoulder $e'$ and closes the valve.

In order to prevent the corrosive liquid from coming in contact with the screw-thread upon the sleeve F, and from passing up between the sleeve and the valve-stem, so as to corrode the said parts and prevent them from being easily manipulated, I employ a diaphragm, H, having a central opening which fits tightly around the valve-stem D' above the valve D. As here represented, the diaphragm is considerably thickened around the central opening, so as to give the diaphragm an extended bearing on the stem, and the diaphragm may fit in an annular groove or recess, $f$, in the stem. The outer edge of the diaphragm is tightly clamped in the part A by the edge of the part B, and an increase of pressure in the shell distends the diaphragm upward, but only binds it tighter upon the stem D', thereby preventing breakage around the stem.

The diaphragm H constitutes a connecting-partition between the valve-stem D' and the inlet-opening in the shell, and prevents any liquid from coming in contact with the movable parts beyond the valve.

In order to prevent the valve D and stem D' from turning relatively to the shell A, I provide the shell with an inwardly-extending feather or tongue, $g$, which engages with a groove, $h$, in the stem and keeps the latter from turning while being moved longitudinally.

The shape and construction of the shell might be modified; but in all cases the diaphragm would fit tightly around the stem D' and be clamped at its outer edge to preclude the passage of liquid past it.

What I claim as my invention, and desire to secure by Letters Patent, is—

1. The combination, in a nozzle, of a valve-shell provided with an inlet-opening, a valve movable longitudinally in said shell to close said opening, a hollow valve-stem and attached jet-pipe, through which the liquid is discharged, connected to said valve and moving with it, and a flexible diaphragm forming a connecting-partition between the hollow valve-stem and the valve, and separating the moving parts which work the valve from the inlet-opening, substantially as and for the purpose specified.

2. The combination, in a nozzle, of the hollow movable stem D' and its attached valve D, the shell A B, containing the valve-seat $b$, and having a screw-socket, A', the valve-operating sleeve F, and the diaphragm H, forming a connecting-partition between the shell and the movable stem, and protecting the movable parts of the nozzle beyond the valve, substantially as and for the purpose specified.

3. The combination of the shell A B, the valve D, the grooved valve-stem D', the sleeve F, the diaphragm H, and the feather $g$, fixed in said shell and engaging with the groove in the valve-stem, substantially as specified.

ALMON M. GRANGER.

Witnesses:
CHANDLER HALL,
E. P. JESSUP.